US006478513B1

(12) United States Patent
Higuchi et al.

(10) Patent No.: US 6,478,513 B1
(45) **Date of Patent: *Nov. 12, 2002**

(54) FLUID PUMPING APPARATUS FOR PARTICULATE MATERIAL SYSTEM

(75) Inventors: Fumii Higuchi, Mississauga (CA); Ronald B. Gaiser, Grimsby (CA)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/090,310

(22) Filed: Mar. 4, 2002

Related U.S. Application Data

(62) Division of application No. 09/640,051, filed on Aug. 17, 2000.

(51) Int. Cl.[7] ................................................ B65G 51/16

(52) U.S. Cl. ............................ 406/19; 406/26; 406/50; 406/109

(58) Field of Search ............................ 406/26, 27, 73, 406/85, 12, 19, 50, 109, 96, 98, 636, 59; 222/344, 334, 65, 118; 417/395

(56) References Cited

U.S. PATENT DOCUMENTS

| | | | | |
|---|---|---|---|---|
| 2,946,488 A | * | 7/1960 | Kraft | 222/134 |
| 4,521,165 A | * | 6/1985 | Handleman | 417/393 |
| 5,518,344 A | | 5/1996 | Miller et al. | 406/39 |
| 5,622,484 A | * | 4/1997 | Taylor-McCune et al. | 417/393 |

* cited by examiner

*Primary Examiner*—Christopher P. Ellis
*Assistant Examiner*—Joe Dillon, Jr.
(74) *Attorney, Agent, or Firm*—Tarlam I. Nguti

(57) ABSTRACT

A fluid pumping assembly for pumping particulate material includes a pump housing defining a pump cavity including a pumping chamber for handling particulate material, a motive fluid chamber, and a moveable diaphragm. The fluid pumping assembly also includes devices for loading particulate material into the pumping chamber, and for injecting a high pressure, high volume purging fluid into the pumping chamber. Further, the fluid pumping assembly includes a control system having a control valve for shutting off flow of high pressure, high volume purging fluid into the pumping chamber when particulate material is being loaded into the pumping chamber, thus enabling dense phase loading of particulate material, and thereby optimizing a particulate material pumping capacity of the fluid pumping assembly.

4 Claims, 4 Drawing Sheets

FLUID PUMPING APPARATUS FOR PARTICULATE MATERIAL SYSTEM

This application is a divisional of Application No. 09/640,051, filed Aug. 17, 2000.

BACKGROUND

The present invention relates to particulate material handling systems, and more particularly to such a fluid pumping system for pumping particulate material at an optimized capacity.

Particulate material handling and processing systems, such as powder material handling systems, are well known, and typically include the unloading, conveyance and feeding, for example, of powder material from a supply source to an output location. In the case of powder material, such unloading, conveyance and feeding usually include use of a pneumatic pump as disclosed for example in U.S. Pat. No. 5,518,344. A typical powder material conveyance or conveying system also includes a hollow line or conduit having intake and discharge ports across which there is often a need to is regulate not only the rate of powder material flow, but also the state or condition of the powder material where powder material can undesirably pack.

Conventionally, purging fluid or air stays on continuously so. as to dilute the particulate material being pumped. Although useful in fluidizing the particulate material to be pumped out, such purging fluid or air has been found to reduce the rate, and hence the amount, of particulate material being loaded to be pumped. This of course results in an undesirable loss of system throughput capacity.

For example, it has been found that when using a pneumatic diaphragm type pumping system, the system suffers significant disadvantages if it is necessary for some reason to substantially cut down on or reduce the level of the motive air. According to these disadvantages, the conveying capacity of the system usually is slowed down. If there is not sufficient purging fluid or air present, it undesirably causes particulate material to pack not only in the conveying conduits, but also in the diaphragm pump housing itself, thereby undesirably causing the pump to become significantly inefficient even to the point it stops.

There is therefore a need for a fluid pumping system for pumping particulate material at an optimized capacity, and without the disadvantages of conventional systems.

SUMMARY OF THE INVENTION

In accordance with one aspect of the present invention, there is provided a fluid pumping assembly for pumping particulate material includes a pump housing defining a pump cavity including a pumping chamber for handling particulate material, a motive fluid chamber, and a moveable diaphragm. The fluid pumping assembly also includes devices for loading particulate material into the pumping chamber, and for injecting a high pressure, high volume purging fluid into the pumping chamber. Further, the fluid pumping assembly includes a control system having a control valve for shutting off flow of high pressure, high volume purging fluid into the pumping chamber when particulate material is being loaded into the pumping chamber, thus enabling dense phase loading of particulate material, and thereby optimizing a particulate material pumping capacity of the fluid pumping assembly.

DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
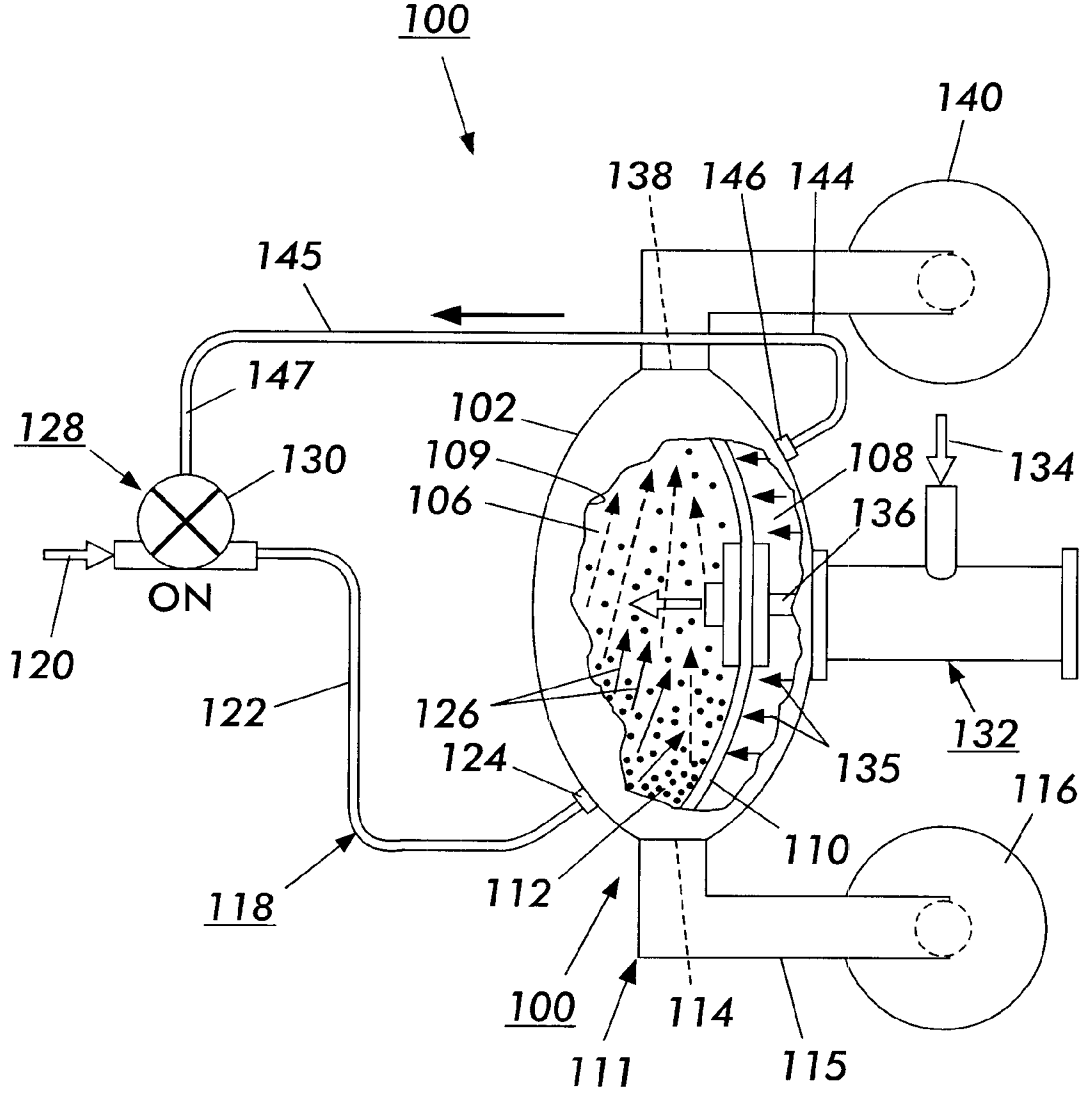
FIG. 1 is a schematic illustration of a first or purging stroke of a fluid pumping assembly of the pumping system of the present invention.
Figure 2:
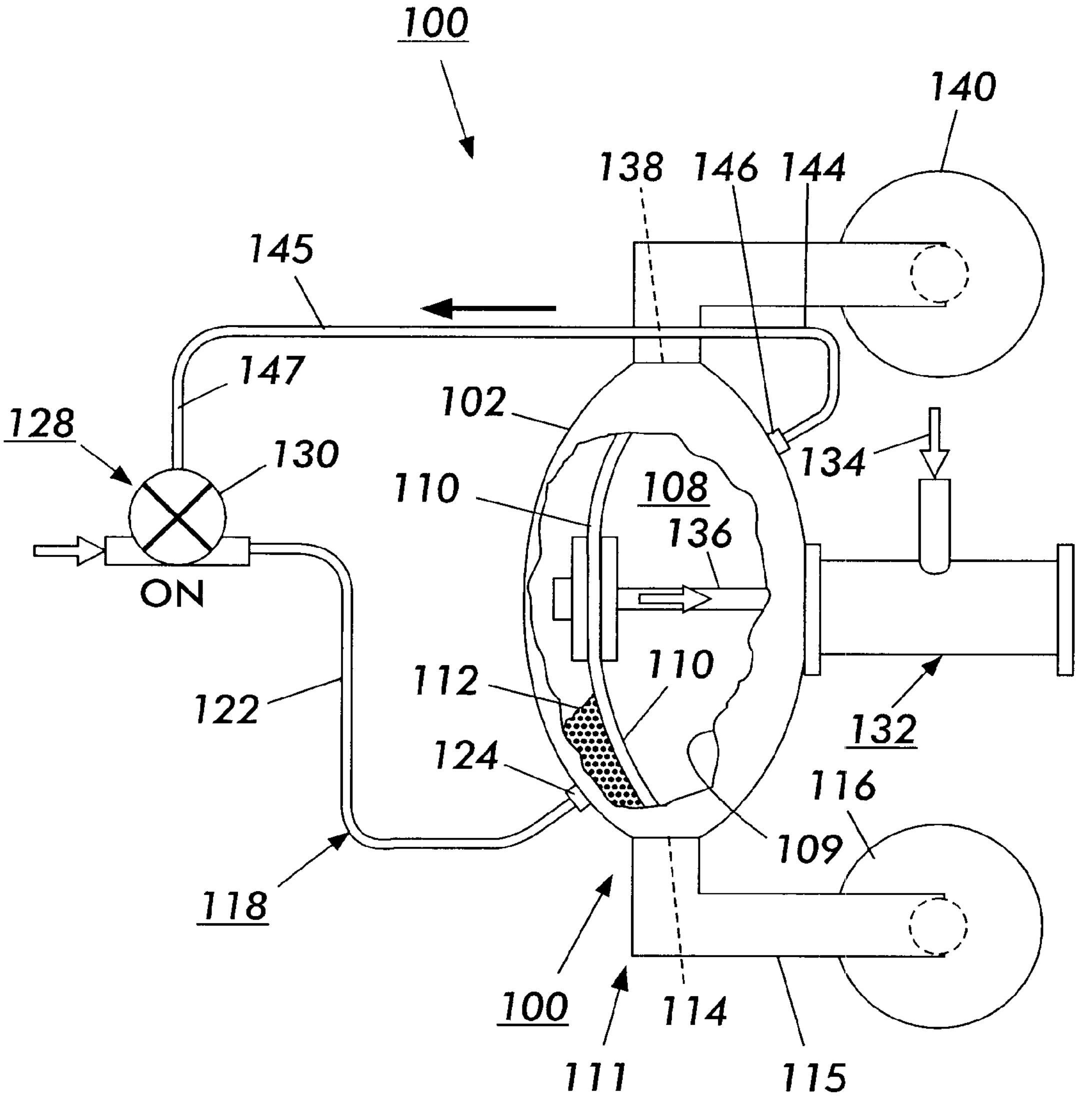
FIG. 2 is a schematic illustration of a second or return stroke of the fluid pumping assembly of FIG. 1.

Referring now to FIGS. 1 and 2, a fluid pumping assembly 100 in accordance with the present invention is illustrated, and is suitable for pumping particulate material, such as a powder material. As shown, the fluid pumping assembly 100 features two pumping strokes, a first or purging stroke (FIG. 1), and a second or return stroke (FIG. 2). The pumping assembly 100 includes a pump housing 102 that defines a pumping chamber 106 for handling particulate material 112, a motive fluid chamber 108, and a moveable diaphragm 110 between the pumping chamber 106 and the motive fluid chamber 108. First means 111 for loading particulate material 112 into the pumping chamber are provided and include a material inlet 114 into the pumping chamber 106 and a conduit 115 connecting the material inlet 114 to a controllable source 116 of moving dense phase particulate material 112.

A second means 118, including a source 120 (arrow) of high-volume, high pressure purging fluid, a purging fluid conduit 122, and a purging fluid inlet 124 into the pumping chamber 106, are provided for injecting high pressure, high volume purging fluid 126 into the pumping chamber 106. In accordance to the present invention, such high pressure, high volume purging fluid 126 is injected into the pumping chamber 106 only during the first stroke (FIG. 1) in order not to reduce particulate material 112 loading capacity.

Accordingly, the pumping assembly 100 includes a control system 128 having a control valve 130 that is connected to the second means 118 for turning off or shutting off flow of the high pressure, high volume purging fluid 126 into the pumping chamber 106 during the second stroke (FIG. 2) when particulate material 112 is being loaded into the pumping chamber. As such, particulate material 112 is moved and loaded, in a dense phase, into the pumping chamber, thereby optimizing a particulate material 112 pumping capacity of the fluid pumping assembly 100.

As further illustrated, the fluid pumping assembly 100 includes a motive fluid assembly 132 comprising a source 134 of motive fluid 135, and a piston member 136 connected to the moveable diaphragm 110 for moving the moveable diaphragm between a first position (FIG. 1) and a second position (FIG. 2) within the pump housing 102. The fluid pumping assembly 100 also includes a material outlet 138 from the pumping chamber 106 for particulate material 112 being purged from the pumping chamber. As such, particulate material 112 can be loaded in a dense phase into the pumping chamber 106 with the purging fluid 126 cut off, and then purged from the pumping chamber 106 through the material outlet 138 to an output location 140.

The control valve 130 for example can be a pilot fluid operated control valve 130. In a pumping assembly where the motive fluid is compressed air, the fluid operated valve will be a pneumatic to pneumatic control valve for controlling the injection of high volume, high pressure air, into the pumping chamber 106 where dense particulate material 112 has already been accepted or loaded. As shown, an input end 144 of a pilot fluid conduit 145 is connected to a tapped hole or pilot fluid outlet 146 formed through the housing 102 into the motive fluid chamber 108 of the fluid pumping assembly 100. The output end 147 of the pilot fluid conduit 145 is connected to the control valve 130 of the control system 128. A supply of clean compressed motive fluid is thus made available to an inlet port of the control valve 130 for activating or turning the control valve 130 on, and allowing the flow of high pressure, high volume purging fluid into the pumping chamber 106.

Figure 3:
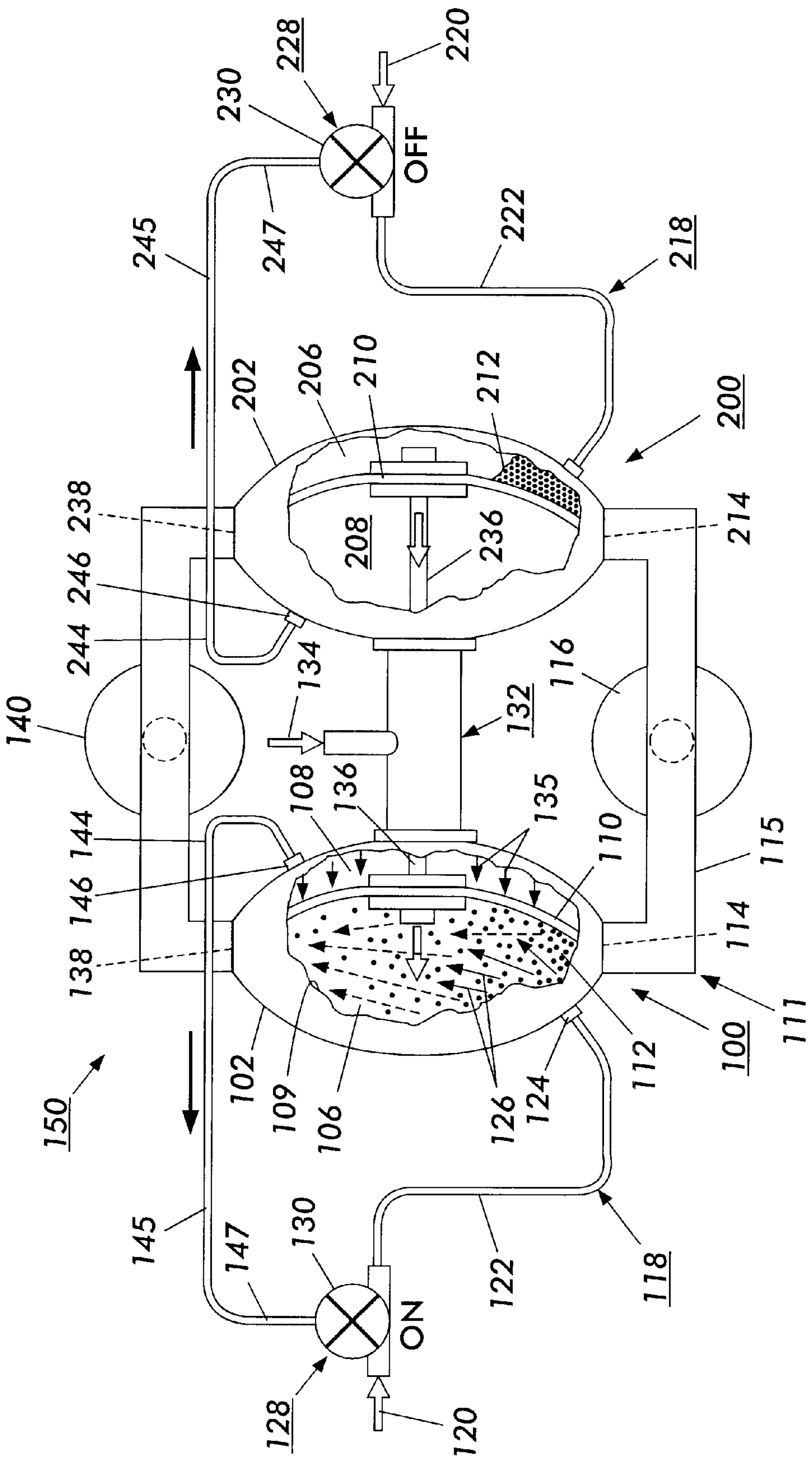
FIG. 3 is a schematic illustration of the pumping system of the present invention showing first and second pumping assemblies, a first stroke of the first pumping assembly, and a second stroke of the second pumping assembly in accordance with the present invention.
Figure 4:
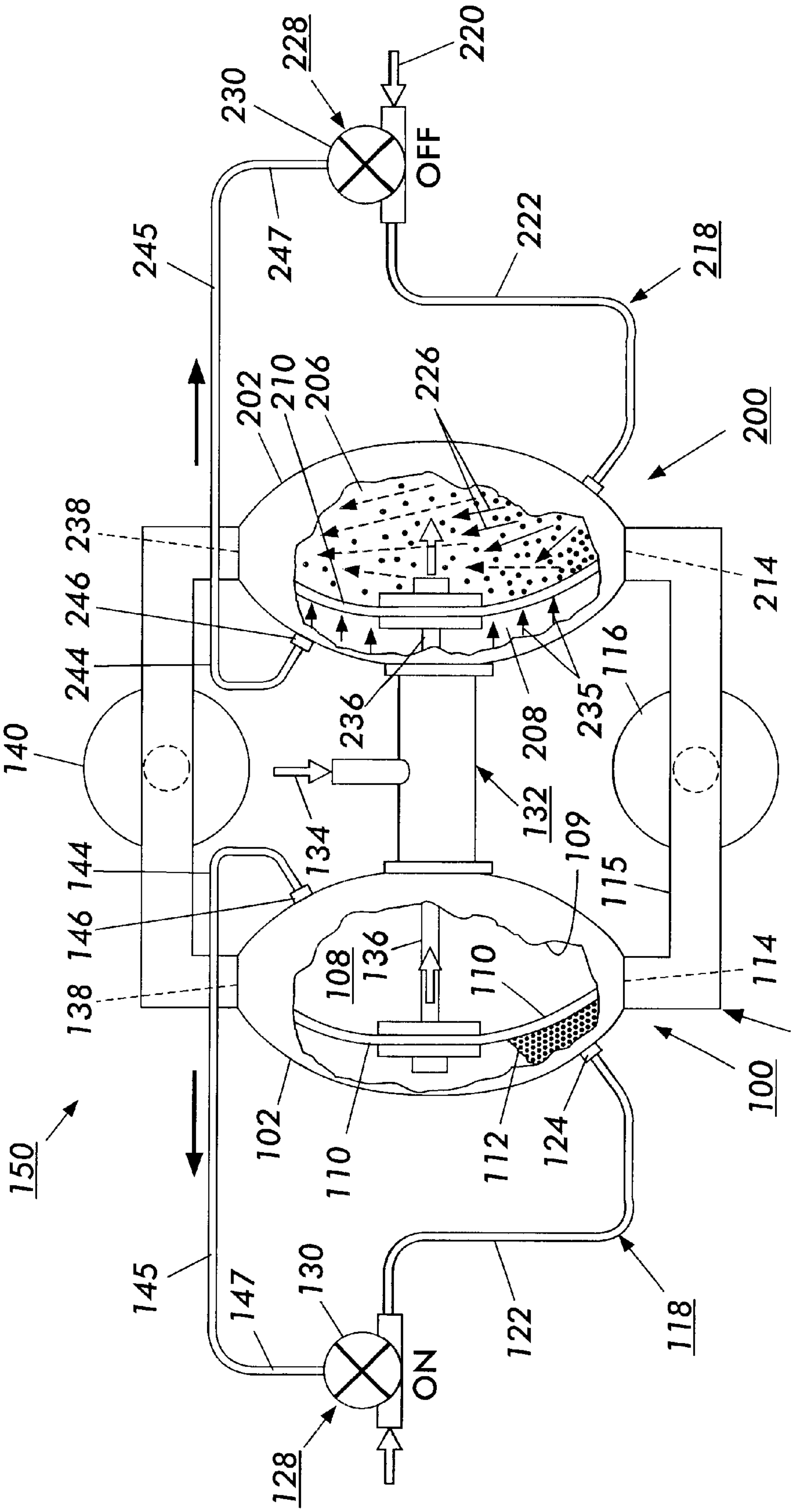
FIG. 4 is a schematic illustration of the pumping system of the present invention showing the first and second pumping assemblies, a second stroke of the first pumping assembly, and a first stroke of the second pumping assembly in accordance with the present invention.

Referring now to FIGS. 3 and 4, a fluid pumping system 150 in accordance with the present invention is illustrated, and is suitable for pumping particulate material as above. As shown, the fluid pumping system 150 includes the first pumping assembly 100 and a second pumping assembly 200 for alternately pumping particulate material 112, 212 from a common supply source 116 to an output location 140, that can be common. The second fluid pumping assembly 200 is identical to the first fluid pumping assembly 100 as described above. Accordingly, elements of the second fluid assembly that are the same or common with those of the first assembly 100 will be numbered similarly, either identically or at the 200 level rather the 100 level as above. For example, the pump housing for the first assembly is 102, and for the second assembly, it is 202 (FIGS. 3 and 4).

As further illustrated, the system 150 includes a common motive fluid assembly 132 including a second piston member 236 for alternatingly moving the moveable diaphragms 110, 210 of the first and second pumping assemblies 100, 200 respectively. The system as such includes a second and separate two-way control valve 230 for the second pumping assembly 200, but equally the system 150 can instead include a common four-way control valve for controlling the flow of purging fluid through the purging fluid conduits 122, 222 respectively.

Still referring to FIGS. 3 and 4, the fluid pumping system 150 of the present invention is suitable for pumping dense phase particulate material 112 such as a slurry, as well as highly fluidized particulate material, for example a highly fluidized fine powder. In the first stroke (e.g. FIG. 1) of each pumping assembly 100, 200 of the system 150, the pumping assembly 100, 200 accepts or loads particulate material 112, 212, with its purging or fluidizing fluid 126, 226 turned off, and hence in a dense phase or state. In a second or return stroke (e.g. FIG. 2) of each pumping assembly 100, 200 of the system 150, with its purging and fluidizing fluid 126, 226 turned on, the pumping assembly 100, 200 pumps out the accepted or already loaded particulate material 112, 212 in highly fluidized state. The intake dense state of the particulate material 112, 212 optimizes and assures no loss of material intake capacity, and the highly fluidized state of the output material advantageously prevents each pumping assembly 100, 200 from seizing or stopping. As such, the entire fluid pumping system 150 can be kept running trouble free for long periods of time.

In the handling of a powder material such as dry toner particles, it has been found that as the size of the toner particles gets smaller, attempts to pump them using a conventional diaphragm pump having continuous purging air, become harder and harder. On the one hand, the only way such toner can be pumped using a pneumatic diaphragm type pump is to fluidize the toner. Very fine toner is not readily fluidized, and tends to cause a lot of pumping problems. For example, too much fluidization reduces conveying or pumping capacity. On the other hand, not enough fluidization slows down the pump, even to the point of causing it to be seized or stopped due to toner particles compacted within the pumping chamber and conduits.

Referring now to FIGS. 1 and 3, the first stroke (as shown particularly in FIG. 1) of each pumping assembly 100, 200 is an outward stroke of the piston member 136, 236 of the motive fluid assembly 132, 232 under pressure from the motive fluid 135. As illustrated, with particulate material 112, 212 already accepted or loaded (in a dense state) into the pumping chamber 106, 206, of the pumping assembly 100, 200, initiation of the forward stroke (by pressurized motive fluid 135 flowing into the motive fluid chamber 108, 208 and pushing against the diaphragm 110, 210), results in pilot fluid from the motive fluid chamber 108, 208, flowing through the pilot fluid conduit 145 to the control valve 130, 230. The pilot fluid thus activates the control valve 130, 230, turning it on, and thus opening it and allowing a high volume of clean, high pressure purging fluid 126, 226 to be injected into the pumping chamber 106, 206. Such injection fluidizes the accepted particulate material within the pumping chamber, as well as assists in moving such fluidized particulate material through the material or purging outlet 146, and out of the pumping chamber 106, 206.

Referring now to FIGS. 3 and 4, a fluid pumping system 150 in accordance with the present invention is illustrated, and is suitable for pumping particulate material as above. As shown, the fluid pumping system 150 includes the first pumping assembly 100 and a second pumping assembly 200 for alternately pumping particulate material 112, 212 from a common supply source [142]116 to an output location 140, that can be common. The second fluid pumping assembly 200 is identical to the first fluid pumping assembly 100 as described above. Accordingly, elements of the second fluid assembly that are the same or common with those of the first assembly 100 will be numbered similarly, either identically or at the 200 level rather the 100 level as above. For example, the pump housing for the first assembly is 102, and for the second assembly, it is 202 (FIGS. 3 and 4).

As further illustrated, the system 150 includes a common motive fluid assembly 132 including a second piston member 236 for alternatingly moving the moveable diaphragms 110, 210 of the first and second pumping assemblies 100, 200 respectively. The system as such includes a second and separate two-way control valve 230 for the second pumping assembly 200, but equally the system 150 can instead include a common four-way control valve for controlling the flow of purging fluid through the purging fluid conduits 122, 222 respectively.

Still referring to FIGS. 3 and 4, the fluid pumping system 150 of the present invention is suitable for pumping dense phase particulate material 112 such as a slurry, as well as highly fluidized particulate material, for example a highly fluidized fine powder. In the first stroke (e.g. FIG. 1) of each pumping assembly 100, 200 of the system 150, the pumping assembly 100, 200 accepts or loads particulate material 112, 212, with its purging or fluidizing fluid 126, 226 turned off, and hence in a dense phase or state. In a second or return stroke (e.g. FIG. 2) of each pumping assembly 100, 200 of the system 150, with its purging and fluidizing fluid 126, 226 turned on, the pumping assembly 100, 200 pumps out the accepted or already loaded particulate material 112, 212 in highly fluidized state. The intake dense state of the particulate material 112, 212 optimizes and assures no loss of material intake capacity, and the highly fluidized state of the output material advantageously prevents each pumping assembly 100, 200 from seizing or stopping. As such, the entire fluid pumping system 150 can be kept running trouble free for long periods of time.

In the handling of a powder material such as dry toner particles, it has been found that as the size of the toner particles gets smaller, attempts to pump them using a conventional diaphragm pump having continuous purging air, become harder and harder. On the one hand, the only way such toner can be pumped using a pneumatic diaphragm type pump is to fluidize the toner. Very fine toner is not readily fluidized, and tends to cause a lot of pumping problems. For example, too much fluidization reduces conveying or pumping capacity. On the other hand, not enough fluidization slows down the pump, even to the point of causing it to be seized or stopped due to toner particles compacted within the pumping chamber and conduits.

Referring now to FIGS. 1 and 3, the first stroke (as shown particularly in FIG. 1) of each pumping assembly 100, 200 is an outward stroke of the piston member 136, 236 of the motive fluid assembly 132, 232 under pressure from the motive fluid 135. As illustrated, with particulate material 112, 212 already accepted or loaded (in a dense state) into the pumping chamber 106, 206, of the pumping assembly 100, 200, initiation of the forward stroke (by pressurized motive fluid 135 flowing into the motive fluid chamber 108, 208 and pushing against the diaphragm 110, 210), results in pilot fluid from the motive fluid chamber 108, 208, flowing through the pilot fluid conduit 145 to the control valve 130, 230. The pilot fluid thus activates the control valve 130, 230, turning it on, and thus opening it and allowing a high volume of clean, high pressure purging fluid 126, 226 to be injected into the pumping chamber 106, 206. Such injection fluidizes the accepted particulate material within the pumping chamber, as well as assists in moving such fluidized particulate material through the material or purging outlet 146, and out of the pumping chamber 106, 206.

Referring now to FIGS. 2 and 4, a second stroke (as particularly shown in FIG. 2) of each pumping assembly 100, 200 is a backward stroke of the piston member 136, 236 of the motive fluid assembly 132, 232 when pressure from the motive fluid 135 is phased out or switched off from the particular assembly 100, 200. As illustrated, with particulate material 112, 212 already pumped out (in a fluidized state) from the pumping chamber 106, 206, of the pumping assembly 100, 200, initiation of the backward stroke results in a stoppage of pilot fluid flowing through the pilot fluid conduit 145 to the control valve 130, 230. Stoppage of the pilot fluid flow as such deactivates the control valve 130, 230, turning it off, and thus closing it and shutting off the flow of purging fluid 126, 226 into the pumping chamber 106, 206. With the purging fluid 126, 226 turned off as such, particulate material 112, 212, in a dense phase or state can again be accepted or loaded into the pumping chamber 106, 206 to be ready for the next forward, or first stroke of the piston member 136, 236.

Thus in the fluid pumping system 150 of the present invention, as the first pumping assembly 100 is going through its second stroke (FIG. 3) during which it is purging fluidized material out of its pumping chamber, the second fluid pumping assembly 200 (with its purging fluid 226 cut off) is loading particulate material 212 (in a dense state) into its pumping chamber 206. The first stroke of the first pumping assembly 100 comes to an end when the diaphragm 110 thereof has been moved from its first position (FIGS. 1 and 3), into its second position (FIGS. 2 and 4). At the same time the first stroke of the first pumping assembly 100 comes to an end, the piston member 136 thereof strokes out, and the pressurized motive fluid 135 is cut off from the first pumping assembly 100 (and is instead switched to the second pumping assembly 200 in order to initiate the first stroke of the second pumping assembly 200).

As soon as the pressurized motive fluid 135 is cut off from the first pumping assembly 100, the control valve 130 thereof is turned off, and the control valve 230 of the second pumping assembly 200 is turned on, thus opening it and allowing a high volume of clean, high pressure purging fluid 226 to be injected into the pumping chamber 206 thereof. Such injection starts fluidizing the particulate material 212 already within the pumping chamber 206, as well as pumping such fluidized particulate material out from the pumping chamber 206, in a very diluted state.

Since, in the fluid pumping system 150, there is no particulate material 112, 212 loading during the first stroke (e.g. FIG. 1), it has been found that increasing the volume of injected purging fluid 126, 226 into the pumping chamber 106, 206 during the first stroke as such, does not reduce loading capacity overall, but only helps to increase the pumping and purging of the particulate material 112, 212 out of the pumping chamber 106, 206. It is thus recommended to inject (during the first stroke), as high a volume of purging fluid as the purging fluid inlet into the pumping chamber can handle.

As can be seen, there has been provided a fluid pumping assembly for pumping particulate material. The pumping assembly includes a pump housing defining a pump cavity 109 including a pumping chamber for handling particulate material, a motive fluid chamber, and a moveable diaphragm. The fluid pumping assembly also includes devices for loading particulate material into the pumping chamber, and for injecting a high pressure, high volume purging fluid into the pumping chamber. Further, the fluid pumping assembly includes a control system having a control valve for shutting off flow of high pressure, high volume purging fluid into the pumping chamber when particulate material is being loaded into the pumping chamber, thus enabling dense phase loading of particulate material, and thereby optimizing a particulate material pumping capacity of the fluid pumping assembly.

While the embodiment disclosed herein is preferred, it will be appreciated from this teaching that various alternative, modifications, variations or improvements therein may be made by those skilled in the art, which are intended to be encompassed by the following claims.

What is claimed is:

1. A fluid pumping assembly for particulate material comprising:

(a) a pump housing including a pumping chamber for handling particulate material, a motive fluid chamber, and a moveable diaphragm between said pumping chamber and said motive fluid chamber;

(b) a first means for loading particulate material into said pumping chamber;

(c) a second means for injecting a high pressure, high volume purging fluid into said pumping chamber;

(d) motive fluid for fluidizing particulate material and moving said moveable diaphragm between said pumping chamber and said motive fluid chamber; and (e) a control system having a control valve connected to said second means for turning off said second means when said first means is loading particulate material into said pumping chamber, thus enabling particulate material to be loaded in a dense phase into said pumping chamber, and thereby optimizing a particulate material moving capacity of the fluid pumping assembly.

2. The fluid pumping assembly of claim 1, wherein said first means include a controllable source of dense phase particulate material, a material, inlet into said pumping chamber, and a conduit connecting said material inlet to said controllable source of dense phase particulate material.

3. The fluid pumping assembly of claim 1, wherein said second means include a source of high pressure, high volume purging fluid, a purging fluid inlet into said pumping chamber, and a purging fluid conduit having an outlet end connected to said purging fluid inlet and an inlet end connected to said source of high pressure, high volume purging fluid.

4. The fluid assembly of claim 1, including a third means comprising a pilot fluid connected to said second means, a pilot fluid outlet from said motive fluid chamber, and a pilot fluid conduit having an inlet end connected to said pilot fluid outlet and an outlet end connected to said control valve of said control means.

* * * * *